J. J. Greenough,
Pegging Machine.
No. 702, Reissued Apr. 26, 1859.
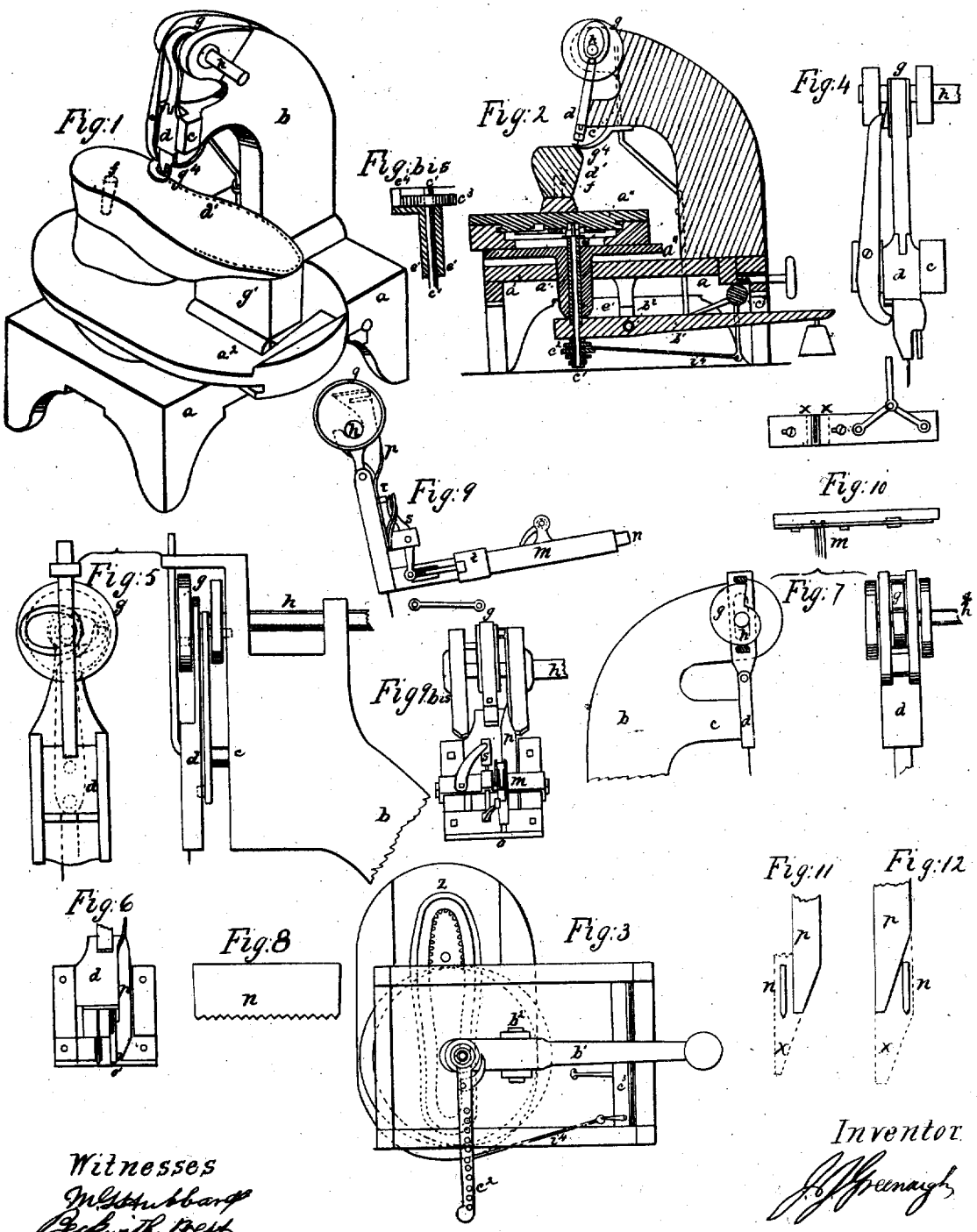
Witnesses
M. L. Hubbard
Beckwith West
Inventor
J. J. Greenough

UNITED STATES PATENT OFFICE.

JOHN JAMES GREENOUGH, OF NEW YORK, N. Y.

IMPROVEMENT IN MACHINES FOR PEGGING BOOTS AND SHOES.

Specification forming part of Letters Patent No. 10,427, dated January 17, 1854; Reissue No. 269, dated July 4, 1854; Reissue No. 702, dated April 26, 1859.

*To all whom it may concern:*

Be it known that I, JOHN JAMES GREENOUGH, of the city, county, and State of New York, did receive Letters Patent of the United States, dated the 17th day of January, 1854, for several inventions in Shoe-Pegging Machinery, which I now desire to separate and to have reissued to me in several distinct patents; and I do hereby describe and ascertain one of my said inventions contained in said Letters Patent, referring to the accompanying drawings, in which—

Figure 1 is a perspective view of the machine; Fig. 2, a vertical section; Fig. 3, a plan from below; Fig. 4, awl and peg stock detached; Fig. 5, a modification; Fig. 6, a front view of pegging-stock, &c.; Fig. 7, a modified section; Fig. 8, peg-wood; Fig. 9, peg-feed; Figs. 10, 11, 12, peg-cutters.

My invention consists in the combination of certain parts herein described in detail, which are for the purpose of forming and driving pegs into the soles of boots and shoes for the purpose of uniting the same. The parts used for this purpose are as follows: First, an apparatus for forming the pegs and feeding them into the driving apparatus. This consists of a trough through which strips of wood are fed, made like the ordinary pegs used in shoe manufacture, but only split off one way, so as to present a series of pegs in a row, as seen in Fig. 8, attached together in a strip. The strip of peg-wood is fed forward at intervals, the breadth of a single peg at a time, by a feed that is perpetual, or such as will feed an infinite series of pegs in succession. This may be effected by a variety of apparatus, such as feed-rollers, or a feed-roller and spring, or an endless screw working into the lower serrated edge of the peg-wood, or by a device shown in the drawing at Fig. 9, all of which are well-known endless feeds, and are but the equivalents of each other.

The device shown at Fig. 9 is a reciprocating feed, in which *m* is the trough through which the peg-wood *n* pasess. On this trough, or beside it, there is a slide, *t*, that is made to slide by a vibrating lever, *s*, to the lower end of which it is attached by a connecting-rod. The lever *s* is vibrated by the upward and downward motion of the pegging stock, (which will be hereinafter described,) so that when the pegging stock rises the peg-wood is fed forward and cut off ready to be driven as the pegging-stock descends. To cut off the peg properly, a cutter must pass through it in a line perpendicular to the top and bottom lines of the peg-strip and at right angles to the side thereof, the cut being made from side to side through the peg-strip without regard to the course of the grain of the wood. This cut may be made by forcing a knife having an inclined back downward so as to cut across the peg-wood, as seen in Fig. 11, in which *n* is the cross-section of the peg-wood; *p*, the knife in position before the cut is made; *x*, dotted lines showing the cut made. Fig. 12 shows a modification in which the edge of the cutter is inclined, which performs a somewhat similar action by being pushed downward into the position shown by dotted lines. Another mode is to force the edge of a knife that is parallel with the side of the peg strip straight forward across it in a plane of motion at right angles thereto, as seen in Fig. 10, the dotted lines showing the range of motion. The combined action of these parts is, first, forcing forward the peg-wood into the recess, and, secondly, cutting off with the knife, which is actuated by a cam, crank-pin, or eccentric from the driving-shaft.

The second device of my combined apparatus is the peg-driver and awl for making the holes and inserting the pegs. These may be on separate stocks, and driven alternately; but I prefer to put them both into one sliding stock, which is made to slide up and down in the frame or standard of the machine.

In Fig. 1, *a a* is the base of the frame, from which rises the standard *b*, that at its upper end projects over sufficiently at *c* to hold the slide that pegs the shoe, and above the slide is the driving-shaft *h*, from which all the parts are moved. On this shaft there is an eccentric or crank or cam (the latter is shown in the drawing) of any style known which will give the desired motion, which may be regular like a simple crank or eccentric, or irregular. This latter can be effected by the cam seen in Fig. 1, or by a grooved cam, and this irregular motion I prefer; but it is essential that the motions up and down should be positive and controlled in their range, forcing down the awl and peg to the precise point and drawing them back to a proper point at each action.

The awl and peg driver stock is shown at Fig. 4, detached. At Fig. 5 a modification is seen. The peg-driver *d* plays up and down in the recess *o*, Fig. 6, into which the peg-strip is fed when the peg-driver is raised, and the peg is then cut off, (or it may have been previously cut off,) and as the peg-driver descends it forces the peg down through the sole of the boot or shoe into the hole previously made for it by the awl.

The third device is for moving the shoe. The awl descends down into the sole at the same time the peg is driven, and at a sufficient distance therefrom to set the next peg. When it is driven into the sole, the stock is moved sidewise by a cam or other equivalent device. The stock may either slide sidewise or turn on an arm of sufficient radius to change the angle of the awl but little. Fig. 4 shows the first, and Fig. 5 the second, method. The side movement of the stock when the awl is in the shoe sole carries the shoe along the same distance, and brings the hole thus made in the sole in line with the peg when driven, the effect being the same whether the sole is carried along straight or is swiveled to peg around a curve, the motion of the shoe being entirely dependent upon the awl as a center.

The fourth device is for the purpose of holding the shoe and properly presenting the sole to be pegged. It consists of what I denominate a "universal-movement carriage or holder." This is designed to give the shoe all the necessary movements to bring each portion of the edge of the curved and undulating sole up to a stationary point to receive a line of pegs all round. To effect this I employ a horizontal lever, $b'$, Fig. 2, on one end of which I support a standard, $a'$, on the top of which standard there is a horizontal plane, $a''$. This is counterbalanced by a weight at the opposite end of the lever $b'$, the fulcrum being at $b^2$. On the top of this plane two slides—one above the other—have a motion at right angles to each other, as clearly seen in Fig. 1, and on the top of the upper one the shoe is affixed. Now, it will be seen that if the lower plane has a revolving motion a movement in any direction can be effected; and if there is a gage at $g^4$ on the standard for the shoe to rest against it will be kept in place while being moved by the awl, guided by the operator in any direction. It is obvious that if the plane had a motion up and down, and the plate on which the shoe was clamped could slide freely on it without guiding-slides, the same effect might be produced.

Having thus fully described my shoe pegging apparatus, what I claim therein as new, and for which I desire to secure in this reissue of my Letters Patent, is—

1. The combination of the universal-movement carriage and lateral awl movement for properly presenting the shoe to receive the pegs in succession, as herein specified.

2. The combination of the mechanism for the cutting and feeding of the pegs, as herein described, or any equivalent therefor, with the automatic peg-driver, as described.

3. The combination of the following elements, or their mechanical equivalents, namely: the peg-former, the peg-feeder, the peg-driver, and the mechanism for moving the shoe, herein described, thus constituting an automatic machine for pegging shoes, as set forth.

J. J. GREENOUGH.

Witnesses:
JAS. W. FRASER,
SYLVESTER LAY.